United States Patent
Mathiyalagan et al.

(10) Patent No.: US 12,326,767 B2
(45) Date of Patent: Jun. 10, 2025

(54) BANDWIDTH-BASED PHASE CONTROL OF VOLTAGE REGULATOR

(71) Applicant: Intel Corporation, Santa Clara, CA (US)

(72) Inventors: Vijay Anand Mathiyalagan, Chennai (IN); Madhusudan Chidambaram, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 842 days.

(21) Appl. No.: 17/354,736

(22) Filed: Jun. 22, 2021

(65) Prior Publication Data

US 2022/0404883 A1    Dec. 22, 2022

(51) Int. Cl.
*G06F 1/26* (2006.01)
*G05F 1/10* (2006.01)
*H04L 41/0896* (2022.01)
*H04L 43/10* (2022.01)

(52) U.S. Cl.
CPC .................. *G06F 1/26* (2013.01); *G05F 1/10* (2013.01); *H04L 41/0896* (2013.01); *H04L 43/10* (2013.01)

(58) Field of Classification Search
CPC ..... G06F 1/26; G05F 1/10; G05F 1/46; G05F 1/462; G05F 1/465; G05F 1/66; G05F 3/02; G05F 3/08; H04L 41/0896; H04L 43/10; H04L 41/0897; H02M 3/1584
See application file for complete search history.

(56) References Cited

U.S. PATENT DOCUMENTS 10,854,245 B1 *   12/2020   Shah .................... G06F 1/3275

* cited by examiner

*Primary Examiner* — Jung Kim
(74) *Attorney, Agent, or Firm* — NICHOLSON DE VOS WEBSTER & ELLIOTT LLP (57) ABSTRACT

Apparatuses, systems, and methods for bandwidth-based control of phase count in a voltage regulator. A voltage regulator may supply power to a data circuit that processes data traffic. The voltage regulator includes a plurality of phases to generate an output voltage that is provided to the data circuit. A control circuit determines a bandwidth of the data traffic that is handled by the data circuit and control a number of the phases that are active based on the determined bandwidth.

22 Claims, 4 Drawing Sheets

BANDWIDTH-BASED PHASE CONTROL OF VOLTAGE REGULATOR

FIELD

Embodiments of the present invention relate generally to the technical field of electronic circuits, and more particularly to a voltage regulator circuit with bandwidth-based phase control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In existing system-on-chip (SoC) integrated circuits, the number of phases of the integrated voltage regulator used for the double data rate (DDR) memory subsystem (SS) is provisioned based on maximum load. Accordingly, in low load situations, the voltage regulator has higher efficiency loss since it is operated in an inefficient region.

Some voltage regulators include automatic phase shedding (APS), in which the current supplied by the voltage regulator is monitored and the number of active phases of the voltage regulator is adjusted based on the current. However, APS has implementation difficulties due to inaccuracy in the current monitoring, post-silicon tuning, analog circuitry calibration, and area overhead. Additionally, APS does not effectively protect against maximum load scenarios (Iccmax), since it is reactive and does not react quickly enough. Accordingly, a guardband may be required, which nullifies the power saving benefit of APS.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "substantially," "close," "approximately," "near," and "about," generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Various embodiments herein provide bandwidth-based control of phase count in a voltage regulator. The techniques described herein may be used with voltage regulators that supply power to a data circuit that processes data traffic. The voltage regulator may include a plurality of phases to generate an output voltage that is provided to the data circuit. In various embodiments, a control circuit may determine a bandwidth of the data traffic that is handled by the data circuit and control a number of the phases that are active based on the determined bandwidth.

The data circuit may include, for example, a memory controller (e.g., a memory controller of a DDR memory and/or another suitable type of memory), fabric circuit (e.g., to route data between different circuit blocks of an integrated circuit and/or between different integrated circuits), and/or other suitable data circuit. In embodiments, the voltage regulator may be an integrated voltage regulator, such as a fully integrated voltage regulator. The bandwidth of the data traffic may correspond to a rate of incoming and/or outgoing data, such as the read and/or write transaction rate for a memory controller.

The bandwidth of the data traffic may be measured over successive intervals with an interval duration. In embodiments, the interval duration may be relatively short, such as 0.5 to 5 microseconds (μs). This enables the bandwidth to be measured with fine granularity and quickly adjust to changes in the bandwidth of data traffic. For example, during bursty conditions, the data traffic may have short periods of high bandwidth and periods of lower bandwidth. The control circuit may dynamically adjust the active phase count of the data circuit based on the bandwidth, thereby enabling the voltage regulator to operate in a more efficient region during the periods of lower bandwidth and providing corresponding power savings.

In contrast, the prior technique of dynamic voltage and frequency scaling (DVFS) operates using a much higher interval, typically about 10 milliseconds (ms). Additionally, DVFS adjusts the voltage and frequency at which the memory controller operates (referred to as the V-F point), which requires the data traffic to be interrupted when changes to the V-F point are made.

The bandwidth-based phase adjustment techniques described herein do not change the output voltage of the voltage regulator, and do not change the V-F point of the data circuit. Accordingly, the bandwidth-based phase adjustment may not affect the timing parameters of the data circuit, and may be performed without affecting the data traffic (e.g., without blocking and/or delaying data). In some embodiments, when it is determined that the number of active phases should be increased based on the bandwidth of the data traffic, the control circuit may throttle the data traffic until the number of active phases has been increased in order to provide overcurrent protection. However, this throttling is performed for a relatively short period of time, such as about 200 nanoseconds (ns), that it takes to activate the additional phases.

The bandwidth-based phase control does not preclude the use of DVFS and may be used in combination with DVFS in some embodiments.

In various embodiments, the active phase count of the voltage regulator may be determined based on a maximum current (Iccmax) requirement. Iccmax is function of dynamic capacitance (Cdyn), voltage (V), and frequency (F) (e.g., Icc=Cdyn*V*F). Cdyn for a DDR SS varies based on the bandwidth of the data traffic.

Figure 1:
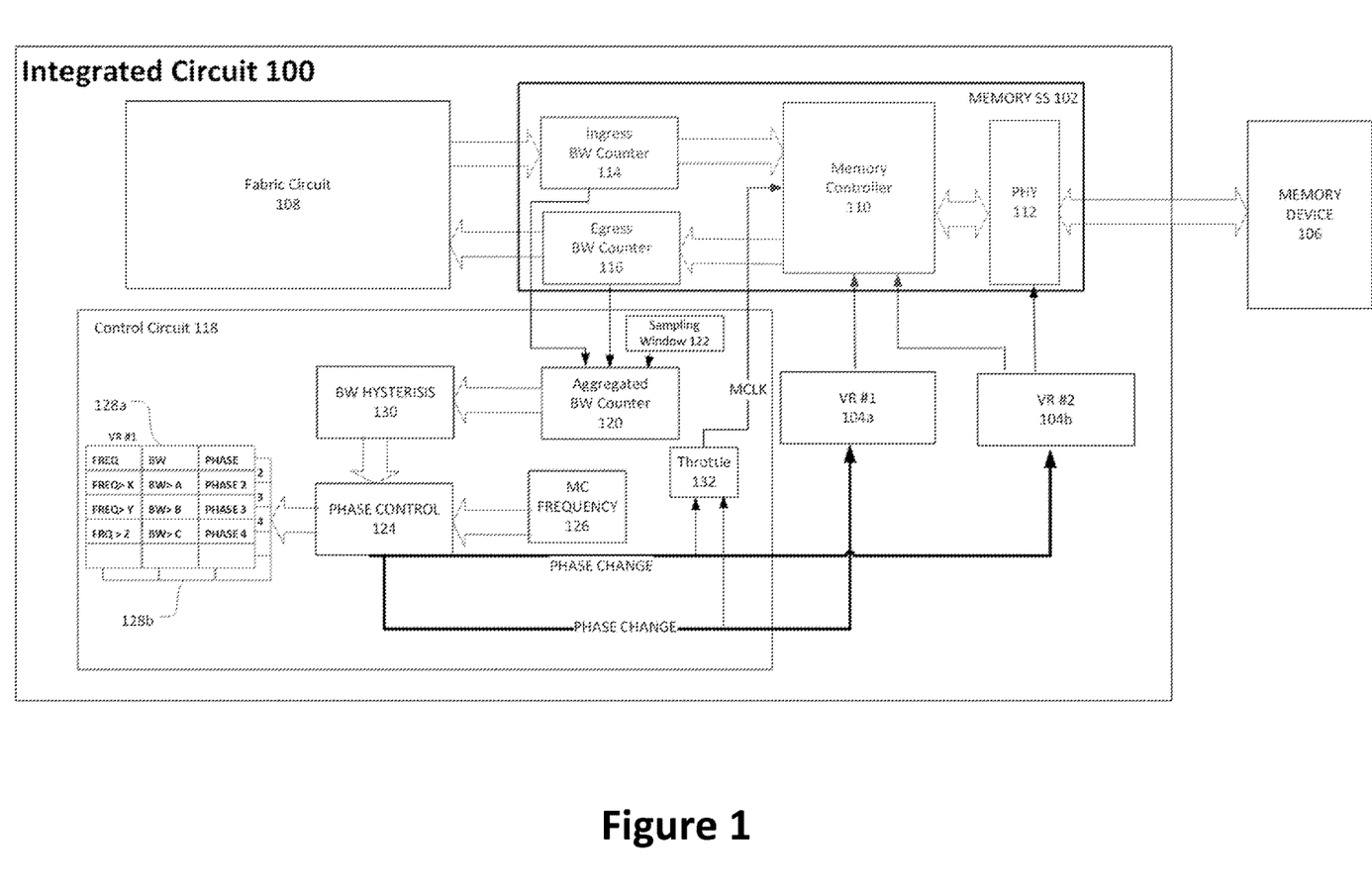
FIG. 1 illustrates an integrated circuit with a control circuit to control a phase count of one or more voltage regulators based on a bandwidth of data traffic of a data circuit, in accordance with various embodiments.

FIG. 1 illustrates an integrated circuit 100 in accordance with various embodiments. In some embodiments, the integrated circuit 100 may be a system-on-chip (SoC). The integrated circuit 100 may include a memory subsystem 102 (e.g., a DDR subsystem) and one or more voltage regulators 104a-b to provide a power supply to the memory subsystem 102. The integrated circuit 100 may further include a fabric circuit 108 coupled to the memory subsystem 102. The fabric circuit 108 may route data between the memory subsystem 102 and other circuit blocks (e.g., one or more processor cores and/or other circuit blocks) of the integrated circuit 100.

The memory subsystem 102 may be further coupled to a memory 108 to write data to the memory 108 and read data from the memory 108. In embodiments, the memory may be a separate device from the integrated circuit 100. The memory 108 may be a DDR memory and/or another suitable type of memory. In various embodiments, the memory subsystem 102 may include a memory controller 110, a physical layer interface 112, an ingress bandwidth counter 114, and/or an egress bandwidth counter 116. The memory controller 110 may control writing data to the memory 108 and reading data from the memory 108 via the physical layer interface 112. The ingress bandwidth counter 114 may track the bandwidth of data that comes into the memory controller 110 (e.g., that is to be written to the memory 108), and the egress bandwidth counter 116 may track the bandwidth of data that comes out of the memory controller 110 (e.g., that is read from the memory 108). The counters 114 and/or 116 may be continuous counters and/or may be reset periodically to enable determination of the bandwidth of data traffic handled by the memory controller 102.

While FIG. 1 illustrates two voltage regulators 104a-b, it will be apparent that embodiments may include any suitable number of one or more voltage regulators 104a-b. Additionally, or alternatively, the integrated circuit 100 may include one or more voltage regulators to provide power to the fabric circuit 108. As previously discussed, the bandwidth-based phase control may be used for the one or more voltage regulators that supply power to the fabric circuit 108 in addition to or instead of for the one or more voltage regulators 104a-b that supply power to the memory subsystem 102. In embodiments, the voltage regulators 104a and 104b may supply power to different portions of the memory subsystem 102 and/or otherwise have different output requirements. For example, as shown in FIG. 1, the voltage regulator 104a may provide a power supply to the memory controller 110, and the voltage regulator 104b may provide a power supply to the memory controller 110 and the physical layer interface 112.

In various embodiments, the integrated circuit 100 may further include a control circuit 118 to control a number of active phases of the voltage regulator 102a and/or 102b based on the bandwidth of data traffic handled by the memory controller 110 over one or more sampling windows. The control circuit 100 may include an aggregated bandwidth counter 120 to determine the bandwidth of data traffic over a sampling window (e.g., stored at 122). The bandwidth may be determined based on the ingress bandwidth counter 114 and the egress bandwidth counter 116, e.g., as further discussed with respect to FIG. 2.

The control circuit 118 may further include a phase control circuit 124 to determine a number of phases of the voltage regulator 104a and/or 104b that should be active based on the determined bandwidth. In some embodiments, the number of phases that should be active may be determined further based on the operating frequency and/or voltage of the memory controller 110 (e.g., provided by a circuit block 126). In some embodiments, the operating voltage may be known for a given operating frequency, and thus only the operating frequency may need to be provided to the phase control circuit 124.

In various embodiments, the phase control circuit 124 may determine the number of phases that should be active based on one or more lookup tables 128a-b. In some embodiments, there may be different lookup tables 128a-b for different voltage regulators 104a-b. For example, the voltage regulators 104a-b may have different numbers of active phases that are needed for a given bandwidth, operating frequency, and/or voltage. In other embodiments, the same lookup table 128a-b may apply to two or more voltage regulators 104a-b.

Figure 3:
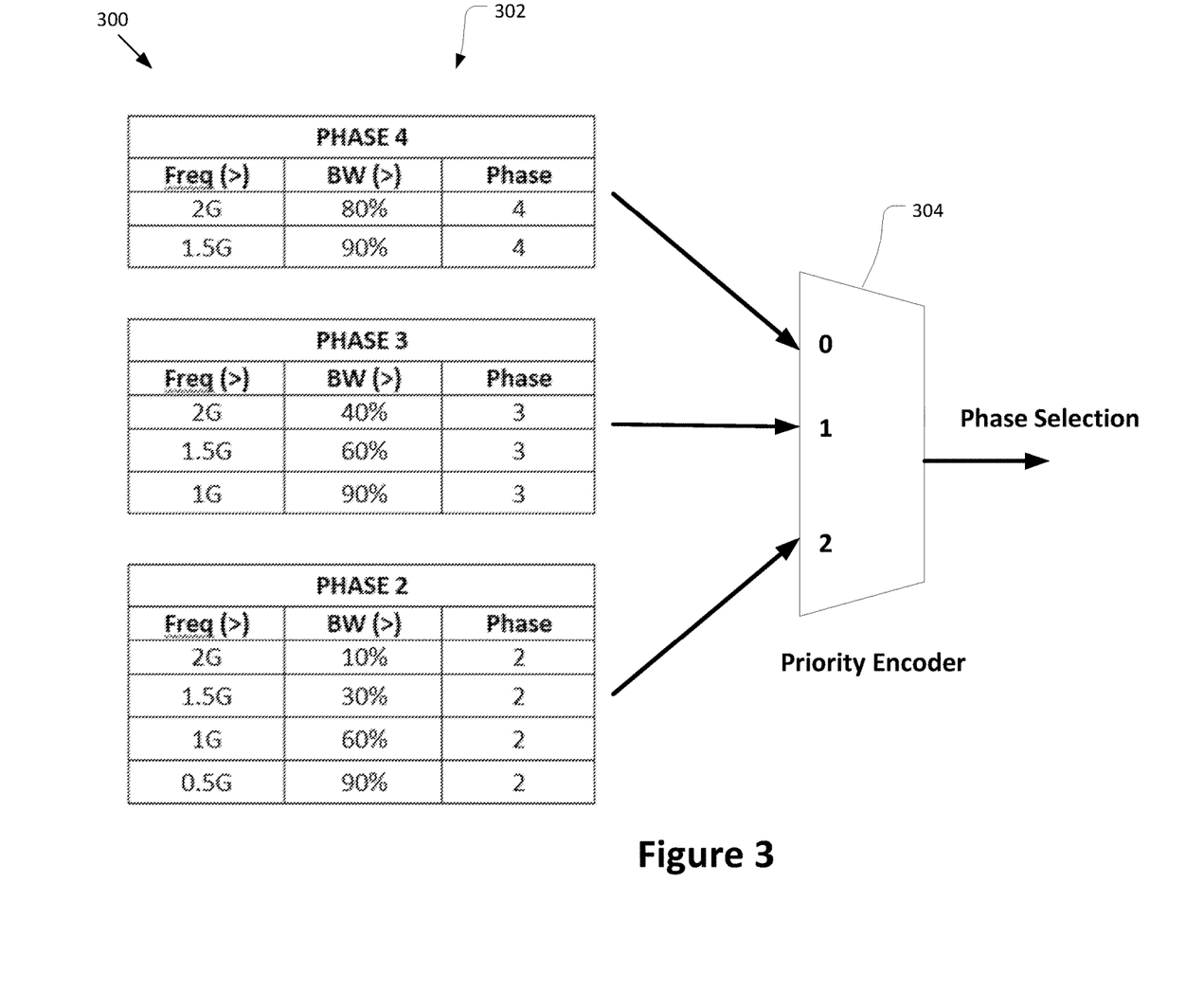
FIG. 3 schematically illustrates a phase lookup procedure, in accordance with various embodiments.

FIG. 3 schematically illustrates one example phase lookup procedure 300 in accordance with various embodiments. The phase lookup procedure 300 may be implemented by a phase control circuit (e.g., phase control circuit 124) in some embodiments. A lookup table 302 may include respective rows that include one or more conditions and a corresponding phase count that should be used if the one or more conditions are met. The phase control circuit may determine whether the conditions in one or more rows of the lookup table 302 are met. The conditions may include the bandwidth of data traffic of an associated data circuit. In embodiments, the conditions may further include an operating frequency of the data circuit, as shown in FIG. 3. Additionally, or alternatively, the conditions may include one or more other conditions, such as the operating voltage of the data circuit. If the conditions are met, a positive signal is passed to a respective input of a priority encoder 304 that corresponds to the phase count associated with that row of the lookup table 302. The priority encoder 304 selects the highest phase count that provides a positive signal, and generates an output signal to trigger the voltage regulator to use the selected phase count. In some embodiments, if none of the rows of the lookup table 302 return a positive signal, then the priority encoder 304 may select a lowest supported number of active phases as the phase count (e.g., 1 phase, 2 phases, or another suitable phase count).

Referring again to FIG. 1, in some embodiments, the control circuit 118 may further include a hysteresis circuit 130. The hysteresis circuit 130 may prevent changes in the number of active phases from becoming too frequent. For example, the hysteresis circuit 130 may require that the determined bandwidth is low enough over multiple individual sampling windows in a row before the number of active phases is reduced. The hysteresis circuit 130 may generally not require the bandwidth of successive sampling windows be high before increasing the number of active phases, in order to avoid an overcurrent event.

In some embodiments, the control circuit 118 may further include a throttle circuit 132. When it is determined that the number of active phases should be increased, the throttle circuit 132 may temporarily throttle the memory controller 110 (e.g., to slow/reduce the data traffic) until the number of active phases is increased. This may prevent an overcurrent event from occurring if the bandwidth of the data traffic rapidly increases. The phase control circuit 124 may be able to increase the active phase count of the voltage regulator 104*a-b* quickly (e.g., in about 200 ns), so the memory controller 110 will be throttled for only a short time period.

Figure 2:
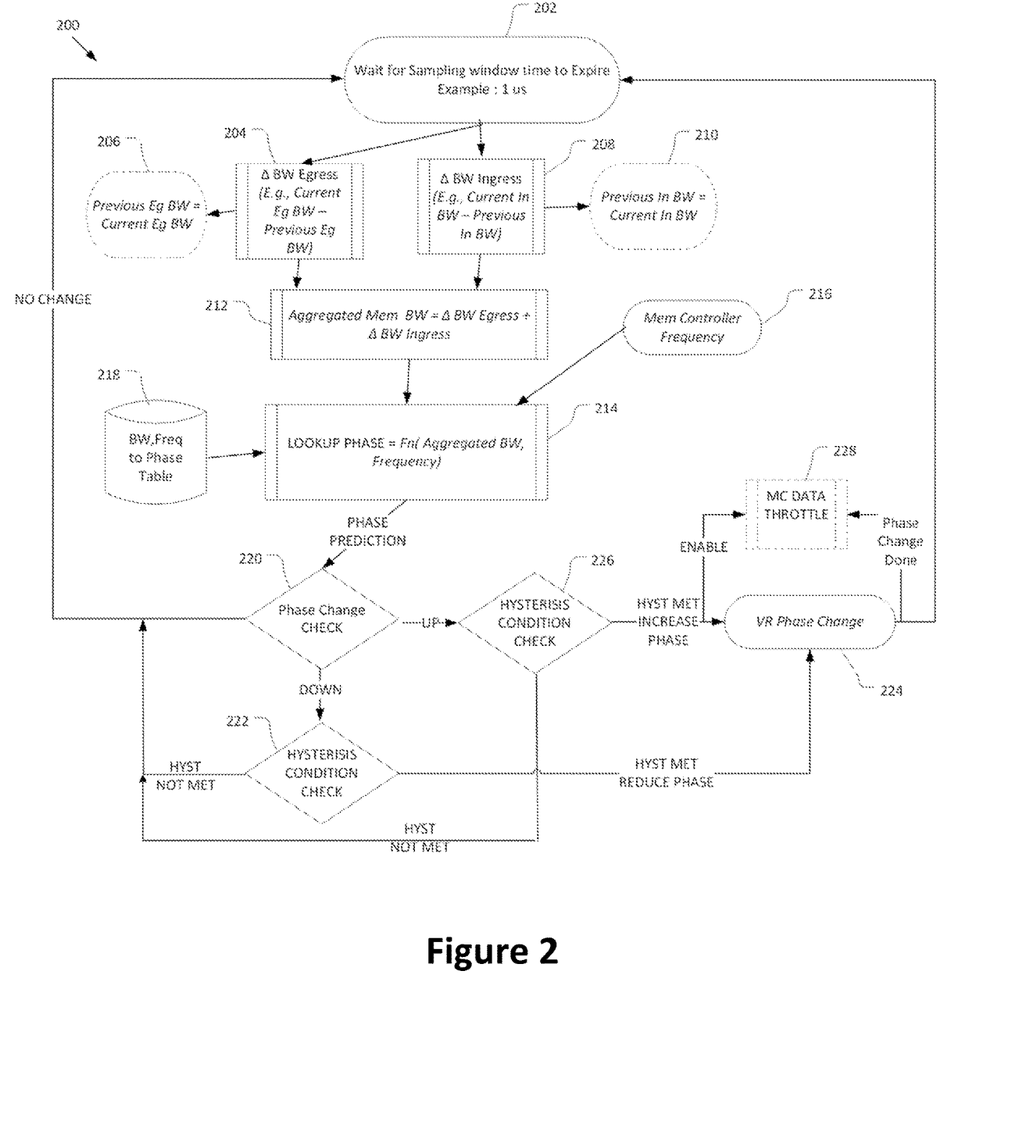
FIG. 2 illustrates a process for bandwidth-based control of the phase count of a voltage regulator, in accordance with various embodiments.

Further aspects of the integrated circuit 100 and/or control circuit 118 may be described with respect to FIG. 2. FIG. 2 illustrates a process 200 for controlling a number of active phases of a voltage regulator based on a bandwidth of data traffic, in accordance with various embodiments. The process 200 may be performed by a control circuit, such as control circuit 118.

At 202, the process 200 may include determining whether a sampling window has expired since a last iteration of the process 200. The sampling window may be any suitable value, such as 0.5 to 10 µs (e.g., 1 µs). Upon expiration of the sampling window, the control circuit may determine the bandwidth of data traffic handled by a data circuit (e.g., memory controller 110 and/or fabric circuit 108) during the sampling window.

For example, at 204, the process 200 may include determining an egress bandwidth. The egress bandwidth may be determined, for example, by receiving a current egress bandwidth value from an egress bandwidth counter (e.g., egress bandwidth counter 116) and subtracting a previous egress bandwidth value (e.g., stored in memory at 206). Additionally, at 208, the process 200 may include determining an ingress bandwidth. The ingress bandwidth may be determined, for example, by receiving a current ingress bandwidth value from an ingress bandwidth counter (e.g., ingress bandwidth counter 114) and subtracting a previous ingress bandwidth value (e.g., stored in memory at 210). In embodiments, the control circuit may replace the previous egress bandwidth value that is stored at 206 with the current egress bandwidth value and replace the previous ingress bandwidth value that is stored at 210 with the current ingress bandwidth value for the next iteration of the process 200.

At 212, the process 200 may further include determining the aggregated bandwidth of the data circuit. For example, the aggregated bandwidth may be determined as the sum of the determined ingress bandwidth and egress bandwidth.

At 214, the process 200 may further include determining a number of active phases of the voltage regulator that should be active based on the aggregated bandwidth. In some embodiments, the number of active phases may be determined based further on an operating frequency and/or operating voltage of the data circuit. For example, as shown in FIG. 2, the control circuit may receive the operating frequency of the memory controller at 216.

In some embodiments, the number of active phases may be determined at 214 based on a lookup table 218. In other embodiments, the number of active phases may be determined using another mechanism, such as a mathematical formula.

At 220, the process 200 may include determining whether the determined number of active phases indicates that the current number of active phases should be increased or decreased. If there is no change in the number of active phases, the process 200 returns to block 202 to perform the next iteration of the process 200. If the determined number of active phases indicates that the current number of active phases should be decreased, the process proceeds to block 222. At block 222, the process 200 may include determining whether one or more hysteresis conditions for decreasing the phase count have been met. For example, the control circuit may determine whether the number of successive iterations of the process 200 that indicated the number of active phases should be decreased is at least a first threshold. If not, the process 200 returns to block 202 to perform the next iteration of the process 200. If the first threshold is met, then the process 200 proceeds to a phase change block 224 to reduce the number of active phases of the voltage regulator.

If, at block 220, it is determined that the number of active phases should be increased, the process 200 proceeds to block 226. At block 226, the process 200 may include determining whether one or more hysteresis conditions for increasing the phase count have been met. For example, the control circuit may determine whether the number of successive iterations of the process 200 that indicated the number of active phases should be increased is at least a second threshold. If not, the process 200 returns to block 202 to perform the next iteration of the process 200. If the second threshold is met, then the process 200 proceeds to phase change block 224 to increase the number of active phases of the voltage regulator.

In some embodiments, the second threshold may be less than the first threshold. For example, the second threshold may be 1-3 iterations, and the first threshold may be 1-10 iterations. In embodiments in which the second and/or first threshold is 1, the corresponding hysteresis block 226 or 222 may be omitted from the process 200. In some embodiments, the first and/or second threshold may be dynamically adjusted, e.g., depending on one or more parameters of the voltage regulator, one or more parameters of the data circuit, and/or past hysteresis event information.

In various embodiments, after the number of active phases of the voltage regulator is adjusted at block 224, the process 200 may return to block 202 to perform the next iteration of the process 200.

In some embodiments, the process 200 may further include a throttle block 228 that temporarily throttles the data traffic of the data circuit when the process 200 determines to increase the number of active phases of the voltage regulator. The data traffic may be throttled until the number of active phases is increased at block 224, and then the throttling is stopped.

The throttling may be performed using any suitable throttling technique, such as duty cycling (also referred to as clock stealing). For example, to implement duty cycling, one or more clock edges/pulses of the clock signal used by the data circuit may be suppressed. Accordingly, no data may be queued and/or processed based on the suppressed clock edges/pulses. In some embodiments, the amount of throttling may be based on the transition in phase count that is triggered. For example, greater duty cycling (greater number/frequency of suppressed clock edges/pulses) may be used when there is a transition to a higher phase count and/or when the transition has a greater difference in phase count. One example of a phase change and corresponding duty cycling percentage is shown in Table 1 below.

TABLE 1

| Phase Change | Duty Cycling % |
| --- | --- |
| phase 2 → 3 | 20% |
| phase 2 → 4 | 60% |
| phase 3 → 4 | 40% |

In other embodiments, the throttling may be achieved using one or more data path throttling techniques. For example, the memory controller may be limited to queueing in new requests in a Read/Write queue only for X cycles during Y cycles duration (X<Y), instead of every clock cycle. In some embodiments, such throttling may correspond to the duty cycling percentages of Table 1. For example, for Y equal to 32 cycles, the duty cycling may be in increments of 3.125% from X=31 (e.g., 3.125% duty cycling) to X=1 (e.g., 96.875% duty cycling).

Figure 4:
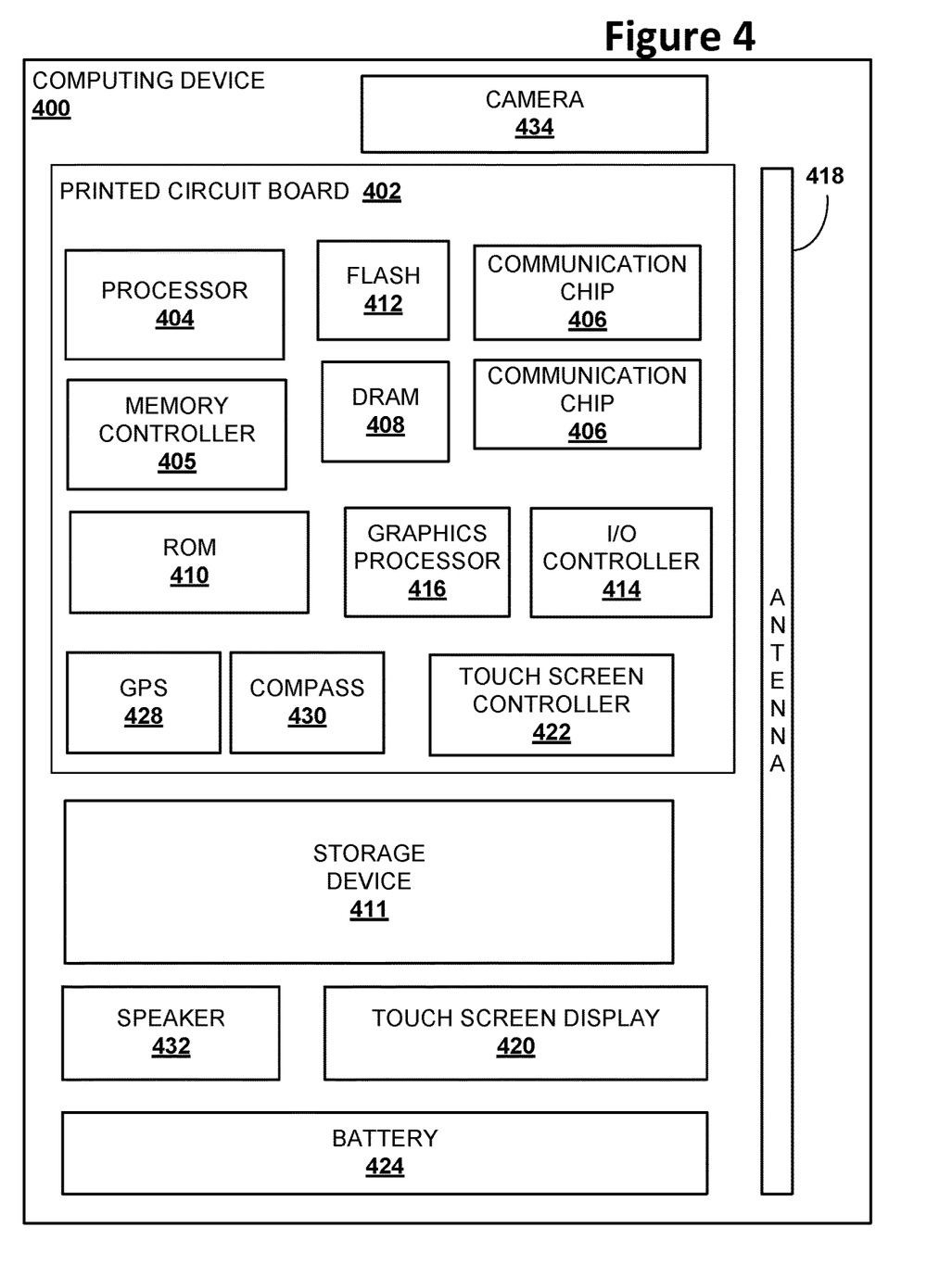
FIG. 4 illustrates an example system configured to employ the apparatuses and methods described herein, in accordance with various embodiments.

FIG. 4 illustrates an example computing device 400 that may employ the apparatuses and/or methods described herein (e.g., integrated circuit 100, process 200, phase lookup procedure 300, etc.), in accordance with various embodiments. As shown, computing device 400 may include a number of components, such as one or more processor(s) 404 (one shown) and at least one communication chip 406. In various embodiments, the one or more processor(s) 404 each may include one or more processor cores. In various embodiments, the at least one communication chip 406 may be physically and electrically coupled to the one or more processor(s) 404. In further implementations, the communication chip 406 may be part of the one or more processor(s) 404. In various embodiments, computing device 400 may include printed circuit board (PCB) 402. For these embodiments, the one or more processor(s) 404 and communication chip 406 may be disposed thereon. In alternate embodiments, the various components may be coupled without the employment of PCB 402.

Depending on its applications, computing device 400 may include other components that may or may not be physically and electrically coupled to the PCB 402. These other components include, but are not limited to, memory controller 405, volatile memory (e.g., dynamic random access memory (DRAM) 408), non-volatile memory such as read only memory (ROM) 410, flash memory 412, storage device 411 (e.g., a hard-disk drive (HDD)), an I/O controller 414, a digital signal processor (not shown), a crypto processor (not shown), a graphics processor 416, one or more antenna 418, a display (not shown), a touch screen display 420, a touch screen controller 422, a battery 424, an audio codec (not shown), a video codec (not shown), a global positioning system (GPS) device 428, a compass 430, an accelerometer (not shown), a gyroscope (not shown), a speaker 432, a camera 434, and a mass storage device (such as hard disk drive, a solid state drive, compact disk (CD), digital versatile disk (DVD)) (not shown), and so forth. In various embodiments, the processor 404 may be integrated on the same die with other components to form a System on Chip (SoC).

In some embodiments, the one or more processor(s) 404, flash memory 412, and/or storage device 411 may include associated firmware (not shown) storing programming instructions configured to enable computing device 400, in response to execution of the programming instructions by one or more processor(s) 404, to practice all or selected aspects of the methods described herein. In various embodiments, these aspects may additionally or alternatively be implemented using hardware separate from the one or more processor(s) 404, flash memory 412, or storage device 411.

In various embodiments, one or more components of the computing device 400 may include and/or employ aspects of integrated circuit 100, process 200, phase lookup procedure 300, and/or other circuits or techniques described herein. For example, the processor 404, communication chip 406, I/O controller 414, memory controller 405, and/or another component of computing device 400 may include and/or employ aspects of integrated circuit 100, process 200, phase lookup procedure 300, and/or other circuits or techniques described herein.

The communication chips 406 may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to IEEE 702.20, Long Term Evolution (LTE), LTE Advanced (LTE-A), 5G, General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 400 may include a plurality of communication chips 406. For instance, a first communication chip 406 may be dedicated to shorter range wireless communications such as Wi-Fi and Bluetooth, and a second communication chip 406 may be dedicated to longer range wireless communications such as GPS, EDGE, GPRS, CDMA, WiMAX, LTE, Ev-DO, and others.

In various implementations, the computing device 400 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an automobile, a medical device, an appliance, a portable music player, a digital video recorder, an electronic sensor, a smart home device, an internet of things (IoT) device, etc. In further implementations, the computing device 400 may be any other electronic device that processes data.

Some non-limiting examples of various embodiments are provided below.

Example 1 includes an integrated circuit comprising: a data circuit that processes data traffic; a voltage regulator to provide a power supply to the data circuit, wherein the voltage regulator includes a plurality of phases; and a control circuit coupled to the voltage regulator. The control circuit is to: determine a bandwidth of the data traffic over a sampling window; and control a number of the phases that are active based on the determined bandwidth.

Example 2 includes the integrated circuit of Example 1, wherein the data circuit is a memory controller.

Example 3 includes the integrated circuit of Example 1, wherein the data circuit is a fabric circuit.

Example 4 includes the integrated circuit of Example 1, wherein the control circuit is to determine the bandwidth of the data traffic based on an ingress counter that corresponds to incoming data to the data circuit and an egress counter that corresponds to outgoing data from the data circuit.

Example 5 includes the integrated circuit of Example 1, wherein the control circuit is to control the number of phases that are active based further on an operating frequency of the data circuit.

Example 6 includes the integrated circuit of Example 5, wherein, to control the number of phases that are active, the control circuit is to determine the number of phases according to a lookup table based on the determined bandwidth and the operating frequency of the data circuit.

Example 7 includes the integrated circuit of Example 5, wherein the control circuit is to control the number of phases that are active based further on a value of the supply voltage.

Example 8 includes the integrated circuit of Example 1, wherein the sampling window is 0.5 to 5 microseconds.

Example 9 includes the integrated circuit of Example 1, wherein, the control the number of phases that are active, the control circuit is to: increase the number of phases based on a first number of one or more successive sampling windows for which the determined bandwidth indicates that the number of phases should be increased; and decrease the number of phases based on a second number of two or more successive sampling windows for which the determined bandwidth indicates that the number of phases should be decreased, wherein the second number is greater than the first number.

Example 10 includes the integrated circuit of Example 1, wherein, to control the number of phases that are active, the control circuit is to: determine that the number of phases that are active should be increased from a current number; throttle a data rate of the data circuit based on the determination; activate one or more additional phases of the voltage regulator so that the determined number of phases are active; and stop the throttle after the activation of the additional phases.

Example 11 includes the integrated circuit of Example 1, wherein the voltage regulator is a first voltage regulator, wherein the integrated circuit further includes a second voltage regulator to supply power to the data circuit, and wherein the control circuit is to determine different a different number of phases that should be active for the second voltage regulator than for the first voltage regulator based on a same bandwidth of the data traffic.

Example 12 includes one or more non-transitory, computer-readable media (NTCRM) having instructions, stored thereon, that when executed by one or more processors cause a control circuit to: determine a bandwidth of data traffic that is processed by a data circuit during a sampling window; determine an active phase count of a voltage regulator based on the determined bandwidth, wherein the voltage regulator is to provide a supply voltage to the data circuit.

Example 13 includes the one or more NTCRM of Example 12, wherein the data circuit is a memory controller or a fabric circuit.

Example 14 includes the one or more NTCRM of Example 12, wherein the active phase count is determined based further on at least one of an operating frequency or an operating voltage of the data circuit.

Example 15 includes the one or more NTCRM of Example 14, wherein the active phase count is determined according to a lookup table.

Example 16 includes the one or more NTCRM of Example 12, wherein, to determine the active phase count, the control circuit is to: increase the active phase count based on a first number of one or more successive sampling windows for which the determined bandwidth indicates that the active phase count should be increased; and decrease the active phase count based on a second number of two or more successive sampling windows for which the determined bandwidth indicates that the active phase count should be decreased, wherein the second number is greater than the first number.

Example 17 includes the one or more NTCRM of Example 12, wherein the determined active phase count is an increase from a previous phase count, and wherein the instructions, when executed, are further to cause the control circuit to: throttle a data rate of the data circuit based on the determined active phase count being an increase from the previous phase count; activate one or more additional phases of the voltage regulator according to the determined active phase count; and stop the throttle after the activation of the additional phases.

Example 18 is a computer system comprising: a memory device; and a system-on-chip (SoC) coupled to the memory device. The SoC includes: a memory subsystem to write data to and read data from the memory device; a voltage regulator to provide a power supply to the memory subsystem, wherein the voltage regulator includes a plurality of phases; and a control circuit coupled to the voltage regulator. The control circuit is to: determine an aggregated bandwidth that corresponds to a write transaction rate and a read transaction rate of the memory subsystem over a sampling window; and control a number of the phases that are active based on the determined aggregated bandwidth.

Example 19 is the computer system of Example 18, wherein the control circuit is to determine the aggregated bandwidth based on an ingress counter that corresponds to the write transaction rate and an egress counter that corresponds to the read transaction rate.

Example 20 is the computer system of Example 18, wherein the control circuit is to control the number of the phases that are active based further on at least one of an operating frequency or an operating voltage of the memory subsystem.

Example 21 is the computer system of Example 20, wherein, to control the number of phases that are active, the control circuit is to determine the number of phases according to a lookup table.

Example 22 is the computer system of Example 18, wherein the sampling window is 0.5 to 5 microseconds.

Example 23 is the computer system of Example 18, wherein, the control the number of phases that are active, the control circuit is to: increase the number of phases based on a first number of one or more successive sampling windows for which the determined aggregated bandwidth indicates that the number of phases should be increased; and decrease the number of phases based on a second number of two or more successive sampling windows for which the determined aggregated bandwidth indicates that the number of phases should be decreased, wherein the second number is greater than the first number.

Example 24 is the computer system of Example 18, wherein, to control the number of phases that are active, the control circuit is to: determine that the number of phases that are active should be increased from a current number; throttle a data rate of the DDR subsystem based on the determination that the number of phases that are active should be increased; activate one or more additional phases of the voltage regulator according to the determined number of phases; and stop the throttle after the activation of the additional phases.

Example 25 is the computer system of Example 18, wherein the memory device is a double data-rate (DDR) memory device.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. An integrated circuit comprising:
a data circuit that processes data traffic;
a switch mode voltage regulator to provide a power supply to the data circuit, wherein the voltage regulator includes a plurality of phases; and
a control circuit coupled to the voltage regulator to:
determine a bandwidth of the data traffic over a sampling window; and
control a number of the phases that are active based on the determined bandwidth, wherein the control circuit is to determine the bandwidth of the data traffic based on an ingress counter that corresponds to incoming data to the data circuit and an egress counter that corresponds to outgoing data from the data circuit.

2. The integrated circuit of claim 1, wherein the data circuit is a memory controller.

3. The integrated circuit of claim 1, wherein the data circuit is a fabric circuit.

4. The integrated circuit of claim 1, wherein the control circuit is to control the number of phases that are active based further on an operating frequency of the data circuit.

5. The integrated circuit of claim 4, wherein, to control the number of phases that are active, the control circuit is to determine the number of phases according to a lookup table based on the determined bandwidth and the operating frequency of the data circuit.

6. The integrated circuit of claim 4, wherein the control circuit is to control the number of phases that are active based further on a value of the supply voltage.

7. The integrated circuit of claim 1, wherein the sampling window is 0.5 to 5 microseconds.

8. The integrated circuit of claim 1, wherein to control the number of phases that are active, the control circuit is to:
increase the number of phases based on a first number of one or more successive sampling windows for which the determined bandwidth indicates that the number of phases should be increased; and
decrease the number of phases based on a second number of two or more successive sampling windows for which the determined bandwidth indicates that the number of phases should be decreased, wherein the second number is greater than the first number.

9. The integrated circuit of claim 1, wherein, to control the number of phases that are active, the control circuit is to:
determine that the number of phases that are active should be increased from a current number;
throttle a data rate of the data circuit based on the determination;
activate one or more additional phases of the voltage regulator so that the determined number of phases are active; and
stop the throttle after the activation of the additional phases.

10. The integrated circuit of claim 1, wherein the voltage regulator is a first voltage regulator, wherein the integrated circuit further includes a second voltage regulator to supply power to the data circuit, and wherein the control circuit is to determine a different number of phases that should be active for the second voltage regulator than for the first voltage regulator based on a same bandwidth of the data traffic.

11. One or more non-transitory, computer-readable media (NTCRM) having instructions, stored thereon, that when executed by one or more processors cause a control circuit to:
determine a bandwidth of data traffic that is processed by a data circuit during a sampling window;
determine an active phase count of a switch mode voltage regulator based on the determined bandwidth, wherein the voltage regulator is to provide a supply voltage to the data circuit, and wherein to determine the active phase count the control circuit is to:
increase the active phase count based on a first number of one or more successive sampling windows for which the determined bandwidth indicates that the active phase count should be increased; and
decrease the active phase count based on a second number of two or more successive sampling windows for which the determined bandwidth indicates that the active phase count should be decreased, wherein the second number is greater than the first number.

12. The one or more NTCRM of claim 11, wherein the data circuit is a memory controller or a fabric circuit.

13. The one or more NTCRM of claim 11, wherein the active phase count is determined based further on at least one of an operating frequency or an operating voltage of the data circuit.

14. The one or more NTCRM of claim 13, wherein the active phase count is determined according to a lookup table.

15. The one or more NTCRM of claim 11, wherein the determined active phase count is an increase from a previous phase count, and wherein the instructions, when executed, are further to cause the control circuit to:
- throttle a data rate of the data circuit based on the determined active phase count being an increase from the previous phase count;
- activate one or more additional phases of the voltage regulator according to the determined active phase count; and
- stop the throttle after the activation of the additional phases.

16. A computer system comprising:
- a memory device; and
- a system-on-chip (SoC) coupled to the memory device, the SoC including:
  - a memory subsystem to write data to and read data from the memory device;
  - a switch mode voltage regulator to provide a power supply to the memory subsystem, wherein the voltage regulator includes a plurality of phases; and
  - a control circuit coupled to the voltage regulator to:
    - determine an aggregated bandwidth that corresponds to a write transaction rate and a read transaction rate of the memory subsystem over a sampling window; and
    - control a number of the phases that are active based on the determined aggregated bandwidth, wherein the control circuit is to determine the aggregated bandwidth based on an ingress counter that corresponds to the write transaction rate and an egress counter that corresponds to the read transaction rate.

17. The computer system of claim 16, wherein the control circuit is to control the number of the phases that are active based further on at least one of an operating frequency or an operating voltage of the memory subsystem.

18. The computer system of claim 17, wherein, to control the number of phases that are active, the control circuit is to determine the number of phases according to a lookup table.

19. The computer system of claim 16, wherein the sampling window is 0.5 to 5 microseconds.

20. The computer system of claim 16, wherein, the control the number of phases that are active, the control circuit is to:
- increase the number of phases based on a first number of one or more successive sampling windows for which the determined aggregated bandwidth indicates that the number of phases should be increased; and
- decrease the number of phases based on a second number of two or more successive sampling windows for which the determined aggregated bandwidth indicates that the number of phases should be decreased, wherein the second number is greater than the first number.

21. The computer system of claim 16, wherein, to control the number of phases that are active, the control circuit is to:
- determine that the number of phases that are active should be increased from a current number;
- throttle a data rate of the DDR subsystem based on the determination that the number of phases that are active should be increased;
- activate one or more additional phases of the voltage regulator according to the determined number of phases; and
- stop the throttle after the activation of the additional phases.

22. The computer system of claim 16, wherein the memory device is double data-rate (DDR) memory device.

* * * * *